United States Patent [19]

Duncan

[11] Patent Number: 5,039,259
[45] Date of Patent: Aug. 13, 1991

[54] DIAMOND EDGE MILLING TOOL

[76] Inventor: Thomas E. Duncan, 746 Kennedy St., Jackson, Mich. 49202

[21] Appl. No.: 533,076

[22] Filed: Jun. 4, 1990

[51] Int. Cl.⁵ .................................................. B23B 51/00
[52] U.S. Cl. .......................................... 407/34; 407/53; 407/61
[58] Field of Search ..................... 407/33, 34, 42, 48, 407/53, 54, 61, 118, 119; 408/145

[56] References Cited

U.S. PATENT DOCUMENTS

| | | | |
|---|---|---|---|
| D. 309,317 | 7/1990 | Tsujimura | 407/54 |
| 3,025,726 | 3/1962 | Miller . | |
| 4,072,438 | 3/1979 | Powers | 407/42 |
| 4,605,343 | 8/1986 | Hibby . | |
| 4,619,563 | 10/1986 | Doting | 407/118 |
| 4,645,384 | 2/1987 | Shimomura | 408/713 |
| 4,702,649 | 10/1987 | Komanduri | 408/145 |
| 4,714,385 | 12/1987 | Komanduri | 407/119 |
| 4,808,045 | 2/1989 | Tsujimura | 407/61 |
| 4,844,669 | 7/1989 | Tsujimura | 408/713 |
| 4,940,369 | 7/1990 | Aebi et al. | 407/12 |

Primary Examiner—Frederick R. Schmidt
Assistant Examiner—Blynn Shideler
Attorney, Agent, or Firm—Beaman & Beaman

[57] ABSTRACT

An end mill having an insert blade utilizing polycrystalline diamond cutting edges along the insert lateral and end edges wherein side milling, surface milling and pocket milling may be achieved with extraordinary tool life.

4 Claims, 1 Drawing Sheet

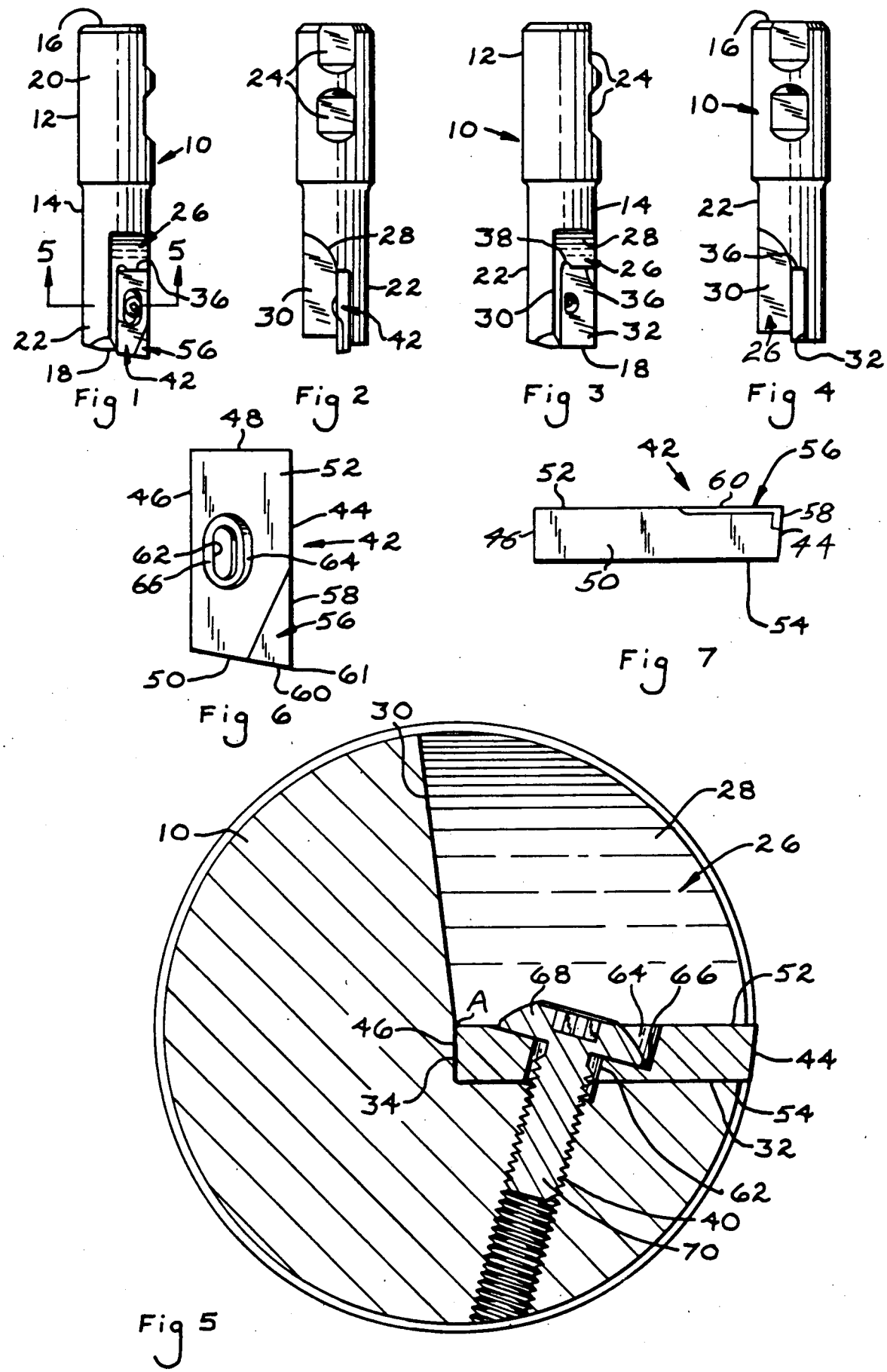

DIAMOND EDGE MILLING TOOL

BACKGROUND OF THE INVENTION

Metal cutting tools such as turning tools, drills and saws have used carbide inserts to improve the life of the cutting edge, and with certain types turning, sawing and drilling operations cutting edges formed of polycrystalline diamond compositions have been used which provide even greater life than carbide tools. Examples of polycrystalline diamond cutting tools are shown in U.S. Pat. Nos. 4,605,343; 4,702,649 and 4,714,385.

While tools using polycrystalline diamond cutting edges have been used primarily with turning tools the advantages of this type of cutting edge have not previously been incorporated into an end mill.

It is an object of the invention to provide an end mill of such construction as to utilize the advantages of polycrystalline diamond cutting edges.

Another object of the invention is to provide an end mill having polycrystalline diamond cutting edges wherein the mill is readily usable with conventional milling machines, and may be employed by milling machine operators without requiring special skills or knowledge.

A further object of the invention is to provide an end mill having polycrystalline diamond cutting edges wherein the polycrystalline diamond edges are defined upon an insert which may be readily installed upon, or removed from, an end mill body for maintenance, sharpening, repair, and the like.

In the practice of the invention a substantially cylindrical end mill body having an end which is clamped within the machine tool spindle includes a recess defined in the other end region of the body. A flat pad surface is defined in the recess receiving a cutting insert having a sharp lateral cutting edge, and a sharp end cutting edge. A layer of polycrystalline diamond material is embedded into the insert defining the effective cutting edges thereof wherein the insert is capable of both side mill and end milling operations.

An obliquely disposed threaded hole is defined in the end mill body which receives a screw extending through a hole defined in the insert for attaching the insert upon the end mill body. The recess includes flat shoulders lying in planes specifically related to the geometry of the body engageable by insert edges wherein the insert will be accurately and firmly positioned with respect to the body.

BRIEF DESCRIPTIONS OF THE DRAWINGS

The aforementioned objects and advantages of the invention will be appreciated from the following description and accompanying drawings wherein:

FIG. 1 is an elevational side view of an end mill of the invention utilizing a polycrystalline diamond cutting edge upon an insert, FIG. 2 is a side elevational view of the end view as taken from the right of FIG. 1, FIG. 3 is an elevational side view of the end mill body, per se, prior to the attachment of the cutting insert thereto, FIG. 4 is a side elevational view of the end mill body as taken from the right of FIG. 3, FIG. 5 is an enlarged sectional view taken through the end mill and insert along Section 5—5 of FIG. 1, FIG. 6 is a plan view of the cutting insert, per se, and, FIG. 7 is an end elevational view of the cutting insert as taken from the bottom of FIG. 6.

DESCRIPTION OF THE PREFERRED EMBODIMENT

An end mill in accord with the concepts of the invention includes an elongated body 10 having a central longitudinal axis as represented at A, FIG. 5, and the body 10 is of a generally cylindrical configuration having a maximum cylindrical outer surface 12 and a slightly smaller cylindrical surface 14. The body includes a transverse end 16, and an opposite end 18. The body end region adjacent the end 16 is designated by the numeral 20, while the body end region 22 is located adjacent the end 18. Flats 24 are defined upon the end region 22 for cooperation with the set screws located within a conventional end mill chuck, or other driving elements, whereby the end region 22 may be firmly held within the rotating spindle of a machine tool, in the normal manner.

A recess 26 is defined in the end region 22, and the recess is formed by the concave surface 28 and the clearance surface 30 which is flat and defined upon a diameter of the body 10 intersecting the axis A.

Within the recess 26 a flat insert pad surface 32 is formed, FIG. 5, and a radial shoulder 34 intersects the pad surface 32 and also intersects the axis A, as apparent from FIG. 5. Remotely from the end 18 a shoulder 36 is defined in the recess 26 perpendicularly disposed to the axis A intersecting the pad surface 32 and the arcuate surface 26. A concave relief notch 38 is defined in the recess intersecting the surfaces 36 and 28, to relieve stress and to also provide clearance to permit the insert to be arcuately located upon the pad surface 32, as later described.

The body end region 22 is provided with a obliquely disposed threaded hole 40, FIG. 5 which intersects the surface 32 at a location radially related to the shoulder 34.

The end mill insert 42 is of a generally rectangular configuration as will be appreciated from FIGS. 6 and 7. The insert includes an outer lateral edge 44, and an inner lateral edge 46. The inner end is designated at 48, while the outer insert end is shown at 50. The flat insert surface 52 defines the "top" of the insert, while the flat insert bottom surface 54 is adapted to rest upon the body pad surface 32.

The primary cutting edges of the end mill insert 42 are formed by a polycrystalline diamond layer 56. This layer may comprise of the type of polycrystalline composition described in U.S. Pat. Nos. 4,605,343; 4,702,649 and 4,714,385. The diamond layer is bonded to the body of the insert 42, and includes a lateral cutting edge 58 and an end cutting edge 60. The cutting edges intersect at the apex 61, FIG. 6 and the edge 58 is of an axial length substantially one-half of the length of the insert and the length of the edge 60 is approximately one-half of the length of the insert end 50.

The insert 42 is mounted within the end mill recess 26 by a threaded screw, and to this end an elongated slot 62 is defined in the insert 42 which intersects the surface 54 and is obliquely related thereto as will be appreciated from FIG. 5. The slot 62 intersects the insert recess 64 which includes the shoulder 66 perpendicularly related to the slot 62.

The head 68 of the screw 70 will engage the shoulder 66 upon the screw 70 being threaded into the body hole 40, and in this manner the insert 42 may be firmly mounted within the body recess 26.

The oblique disposition of the hole 40 and screw 70 forces the insert edge 46 against the body recess shoulder 34, and these surfaces are shaped to tightly engage in a parallel manner. The length of the slot 62 permits the insert end 48 t tightly abut the body shoulder 36, and it will be appreciated that the insert is firmly supported within the body recess 26 at the surfaces 32, 34 and 36.

As will be appreciated from FIGS. 1, 2 and 5, the length of the insert 42 is such that the insert end 50 extends slightly beyond the body end 18, the apex 61 defining the greatest axial dimension of the end mill. Likewise, the cutting edge 58 of the insert radially extends slightly beyond the diameter of the body end region 14.

The recess surface 30 intersects the body axis A and the plane of surface 30 is disposed counterclockwise with respect to the vertical diameter plane as viewed in FIG. 5 approximately three degrees. Accordingly, the obtuse angle defined by the shoulder surface 34 and the surface 30 is 183°, and this angle has proven to most effectively clear chips from the recess 26 during cutting.

In use, the end mill body 10 is clamped within the conventional spindle of the end mill machine tool, not shown, by inserting the end region 20 into the machine tool chuck. Clamping and torque transmitting members defined in the chuck, such as set screws, or the like, engage the flats 24, and in this manner the end mill is firmly mounted within the machine tool chuck and spindle. Thereupon, the end mill is used in the conventional manner and as the polycrystalline diamond layer 56 extends along both the lateral edge 44 of the insert as well as along the insert end 50, as at 58 and 60, respectively, the end mill of the invention may be used in the normal manner for side milling, surface milling, pocket milling, and end milling. The fact that the cutting is occurring at the polycrystalline diamond edges 58 and 60 provides the tool with a very long work life, and end mills constructed in accord with the invention last much longer than other end mills presently available.

If it is desired to replace the insert 42 the screw 70 is readily removed, and upon removing the insert 42 from the body 10 replacement of the insert, or sharpening or repair thereof may be readily accomplished.

It is appreciated that various modifications to the disclosed embodiment of the invention may be apparent to those skilled in the art without departing from the spirit and scope of the invention.

I claim:

1. An end mill having a polycrystalline diamond cutting edge comprising, in combination, an elongated body having an axis, a substantially cylindrical outer surface, a first end, a first end region adjacent said first end, a second end, and a second end region adjacent said second end, torque drive means defined in said first end region, a recess defined in said second end region intersecting said body outer surface at said second end region and intersecting said second end, a flat insert pad surface defined in said recess intersecting said second end and said second end region, said recess including a first shoulder located radially inward of said second end region substantially perpendicular to and intersecting said pad surface, said first shoulder lying within a diametrical plane of said body having an inner edge coinciding with said body axis and a second shoulder located axially inward of said second end substantially perpendicular to said pad surface and said body axis, said insert including an inner lateral edge engaging said first shoulder and an end edge engaging said second shoulder, said recess including a diametrical flat clearance surface extending from said first shoulder inner edge to the outer surface of said second end region, said clearance surface and said first shoulder defining an obtuse angle grater than 180°, a cutting insert having an outer lateral edge and an outer end, said cutting insert engaging said pad and having a first cutting edge defined on said outer end for a length approximately one-half of the length of said inset outer end extending beyond said second end and a second cutting edge defined on said outer lateral edge radially extending beyond said second end region and extending in an axial direction approximately one-half of the axial length of said insert outer lateral edge and intersecting said first cutting edge, said first and second cutting edges being defined by a layer of polycrystalline diamond, and fastening means fastening said cutting insert to said pad surface.

2. In an end mill as in claim 1, said fastening means comprising a threaded hole defined in said body second end region intersection said pad surface, a hole defined in said insert aligning with said threaded hole when said insert is properly positioned on said pad surface, and a threaded screw extending through said insert hole threaded into said threaded hole, said threaded hole being inclined with respect to said pad surface whereby tightening of said screw forces said insert inner lateral edge engaging said first shoulder toward said first shoulder.

3. In an end mill as in claim 1, said clearance surface and said first shoulder defining an obtuse angle of 183°.

4. In an end mill as in claim 1, said insert having a flat upper surface substantially coincident with said cutting edges, said insert upper surface lying within a body diameter intersecting said first shoulder inner edge.

* * * * *